(12) United States Patent
Razzacki

(10) Patent No.: US 7,506,739 B2
(45) Date of Patent: Mar. 24, 2009

(54) HIGH-BREAKTHROUGH-LOAD SYNCHRONIZER WITH STEPPED CONE

(75) Inventor: Syed T Razzacki, Troy, MI (US)

(73) Assignee: Chrysler LLC, Auburn Hills, MI (US)

( * ) Notice: Subject to any disclaimer, the term of this patent is extended or adjusted under 35 U.S.C. 154(b) by 347 days.

(21) Appl. No.: 11/424,630

(22) Filed: Jun. 16, 2006

(65) Prior Publication Data

US 2007/0289834 A1 Dec. 20, 2007

(51) Int. Cl.
*F16D 23/08* (2006.01)

(52) U.S. Cl. .................... 192/53.361; 192/53.3

(58) Field of Classification Search ............ 192/53.361, 192/53.3, 66.21
See application file for complete search history.

(56) References Cited

U.S. PATENT DOCUMENTS

| | | | |
|---|---|---|---|
| 2,338,428 A * | 1/1944 | Guter et al. ............ | 192/53.361 |
| 3,700,083 A | 10/1972 | Ashikawa et al. | |
| 4,566,568 A | 1/1986 | Yant | |
| 4,776,228 A | 10/1988 | Razzacki et al. | |
| 5,036,719 A | 8/1991 | Razzacki | |
| 5,085,303 A | 2/1992 | Frost | |
| 5,135,087 A | 8/1992 | Frost | |
| 5,267,636 A | 12/1993 | Fielding | |
| 5,638,930 A | 6/1997 | Parsons | |
| 5,651,749 A | 7/1997 | Wilson et al. | |
| 5,758,753 A | 6/1998 | Sypula et al. | |
| 2004/0154892 A1 * | 8/2004 | Coxon et al. ............. | 192/53.31 |
| 2005/0262957 A1 | 12/2005 | Razzacki | |

OTHER PUBLICATIONS

Socin et al., "Manual Transmission Synchronizers", SAE Paper No. 680008, Jan. 8-12, 1968.
Razzacki, Syed T., "Synchronizer Design: A Mathematical and Dimensional Treatise", SAE Paper No. 2004-01-1230, Mar. 8-11, 2004.

* cited by examiner

*Primary Examiner*—Rodney H Bonck
(74) *Attorney, Agent, or Firm*—Ralph E. Smith

(57) ABSTRACT

A strut-type synchronizer for coupling a gear to a rotating shaft includes a hub rotating with the shaft, a clutch ring rotatable with the gear, and a friction ring disposed between the hub and the clutch ring. The hub supports several struts for relative axial movement, as urged by an encircling splined sleeve through a detent, into engagement with the friction ring. The friction ring, which does not itself directly engage the sleeve, has a friction surface that is thus urged by the struts into engagement with a complementary friction surface of the clutch ring, whereupon relative rotation between the friction ring and the clutch ring ceases, the detent is overcome, and the sleeve's spline teeth engage complementary spline teeth on the clutch ring to fully engage the synchronizer. The friction surfaces include two axially-spaced frustoconical portions, by which an increased cone torque is achieved during synchronization.

20 Claims, 3 Drawing Sheets

HIGH-BREAKTHROUGH-LOAD SYNCHRONIZER WITH STEPPED CONE

FIELD OF THE INVENTION

The invention relates generally to parallel-shaft transmissions in which a synchronizer is employed to match the rotational speeds of a driving hub and an adjacent driven gear and subsequently mechanically couple the gear to the hub using an axially-slidable synchronizer sleeve.

BACKGROUND OF THE INVENTION

Typical strut-type synchronizers for manual automotive transmissions include a "shifting sleeve carrier" or "hub" that rotates with a given shaft either adjacent to a single gear, or in between a pair of gears, that are respectively mounted on the shaft for free-rotation relative to the shaft. The hub includes a set of peripheral spline teeth and several peripheral axial slots or pockets, each pocket supporting a respective strut for axial movement relative to the pocket. An annular shifting sleeve, encircling and in splined engagement with the hub, engages each strut through a spring-loaded detent that typically includes a circumferential detent groove defined on the inner periphery of the sleeve.

The detent is generally designed to maximally transmit, to the strut, a relatively small fraction of an axial shifting load that is applied to the sleeve through a suitable combination of detent spring rate, the "ramp angle" defined by the detent groove's walls or "ramps," as measured relative to a reference line that is parallel to the rotational axis of the shaft, and the coefficient of friction between the detent and the sleeve (and, in the case of a ball-type detent, the coefficient of friction between the detent ball and the struts' ball-receiving passage). The maximum axial detent load on the strut is generally known as the synchronizer's "breakthrough load" or "BTL." Through known approaches, transmissions intended to provide relatively "smooth" shifts typically employ synchronizer detents that achieve breakthrough loads in the range of about 40 N to about 50 N, or perhaps as little as about 5 percent of the typical 400-800 N applied axial shifting load (often expressed as a ratio of the applied axial shifting load F to the breakthrough load BTL, such known ratios are typically well in excess of 10:1, and perhaps even 20:1 or more), using ramp angles in the range of about 30 to 40 degrees. Even when "firm" shift points are desired, known approaches maximally limit the breakthrough load to no more than about 80-100 N, or roughly fifteen percent of the applied load (i.e, an F-to-BTL ratio of at least about 6.6:1), using maximum ramp angles of up to about 45 degrees.

To rotationally couple one gear to the shaft, a fork applies the axial shifting load to the sleeve to thereby move the sleeve axially relative to the hub toward the gear. The sleeve then operates through the detent to apply a small fraction of the applied axial shifting load F (up to the detent's breakthrough load BTL) to each strut, thereby moving each strut axially toward the gear. The struts, in turn, axially engage a respective baulking or blocking ring, disposed between the hub and the gear and rotatable with the hub, toward a clutch ring that is itself rotationally coupled to the gear. Ultimately, the struts cooperatively urge a conical friction surface on the blocking ring into engagement with a complementary friction surface or "cone" defined on the clutch ring. The resulting frictional engagement between the blocking ring and the clutch ring generates a cone torque that rotationally accelerates or decelerates the clutch ring and its coupled gear relative to the blocking ring and, hence, reduce the rotational speed differential between the hub and the gear.

Ultimately, the blocking ring frictionally bears against the clutch ring sufficiently to stop relative rotation between the sleeve and the gear. The continued application of the axial shifting load to the sleeve then overcomes the detent, and the sleeve moves farther toward the gear as the unloaded strut likewise ceases to axially bear against the blocking ring, with leading-edge chamfers on the sleeve's spline teeth engaging opposing entrance-edge chamfers on a further set of peripheral teeth defined on the blocking ring. After the mating chamfers of the sleeve and the clutch ring cooperate to "clock" the sleeve's spline teeth into angular registration with the blocking ring's peripheral teeth, the sleeve moves even farther and its leading-edge chamfers engage opposing entrance-edge chamfers on a set of peripheral teeth defined on the clutch ring. After this second set of mating chamfers cooperate to clock the sleeve's spline into angular registration with the clutch ring's peripheral teeth, the sleeve moves into "full engagement" with the clutch ring to thereby rotationally "lock up" the selected gear with the shaft.

The foregoing known strut-type synchronizers typical achieve lockup synchronization times in the range of perhaps about 200-300 msec for a typical manual transmission, from the initial movement of the sleeve from its neutral position about the hub, to the point at which the opposed chamfers of the sleeve spline and the clutch ring first begin to mesh (it will be appreciated that an additional time of perhaps about 100 msec is still required to axially displace the sleeve into "full engagement" with the clutch ring, as described above).

In another known strut-type synchronizer, as disclosed in U.S. Pat. No. 5,085,303, a pair of radially-nested friction surfaces or "cones," defined on either side of a "middle cone ring" rotating with the gear and respectively engaging complementary friction surfaces on the blocking ring and an "inner cone ring" rotating with the synchronizer's mainshaft, cooperate in response to the axial movement of the sleeve and struts to generate a relatively-increased cone torque, even when using a relatively-reduced applied axial shifting load or a relatively-reduced detent breakthrough load. Unfortunately, such dual cone synchronizers necessarily feature both an increased parts count, including discrete parts for the blocking ring, the two cone rings, and the clutching ring, and a relatively-increased overall axial synchronizer dimension, in order to achieve the relative increase in generated cone torque. Further, such "dual-cone" synchronizers are susceptible to torque-generation losses as the multiple cone rings link together, and due to tolerance stack-up, such that the best estimate for the resulting cone torque is the square root of the sum of the squares of the cone torque generated due to engagement of each individual cone.

SUMMARY OF THE INVENTION

In accordance with the invention, a strut-type synchronizer for rotatably coupling a gear to a shaft includes an annular hub rotatably coupled to the shaft, and an annular clutch ring that is axially-spaced from the hub and rotationally coupled to the gear. The hub includes a peripheral surface in which both a set of external spline teeth and several circumferentially-spaced pockets are defined. The clutch ring likewise includes a peripheral surface on which a set of external spline teeth are defined, as well as a conical radially-outer friction surface projecting toward a first axial face of the hub. The synchronizer further includes an annular friction ring encircling the shaft and disposed between the hub and the clutch ring, wherein friction ring includes an axial face in opposition to the hub's axial face, and a radially-inner friction surface complementary to and in general opposition with the conical friction surface of the clutch ring. Several struts, each disposed in a respective pocket of the hub so as to be axially movable relative to the hub into engagement with the friction ring's axial face, rotationally couple the friction ring to the hub.

The synchronizer also includes an annular sleeve encircling the hub, wherein the sleeve includes a set of internal spline teeth engaging the external spline teeth of the hub, such that the sleeve rotates with the hub, and further adapted to engage the external spline teeth of the clutch ring when the sleeve is shifted axially relative to the hub, for example, under the control of a fork that engages suitable surface features on a radially outer surface of the sleeve, to thereby couple the hub to the clutch ring. The synchronizer further includes a detent operative to couple the sleeve to each of the struts for axial movement relative to the hub upon application of an axial shifting load to the sleeve.

When the applied axial shifting load exceeds the detent's breakthrough load, the sleeve decouples from the strut and continues to move axially until the sleeve's internal spline teeth engage the external spline teeth of the clutch ring. While the invention contemplates use of any suitable detent configuration, by way of example only, in an exemplary embodiment, a radial passage is defined in the strut, and a detent ball is disposed in the strut passage so as to be positioned proximate to a circumferential detent groove defined in the radially inner surface of the sleeve. A detent spring is disposed in each pocket of the hub such that a radially-inner end of the spring is supported by a radial surface of the hub, and a radially outer end of the spring extends through the radial passage defined in the strut to bias the detent ball into engagement with the sleeve's detent groove.

In accordance with an aspect of the invention, the detent parameters, such as the detent spring rate, the coefficient of friction between the detent ball and the sleeve, and the ramp angle defined by the detent groove's ramps, are selected to achieve a breakthrough load significantly greater than about 100 N. Preferably, the detent's breakthrough load is greater than about 125 N, i.e., the detent achieves an F-to-BTL ratio of no greater than about 4.8:1, for example, when using an average applied axial shifting load F of about 600 N. Most preferably, the detent's breakthrough load is greater than about 150 N, i.e., the detent achieves an F-to-BTL ratio of no greater than about 4:1 when using an average applied axial shifting load F of about 600 N. Indeed, by way of further example only, in an exemplary embodiment, the detent achieves a breakthrough load BTL of at least about 200 N in response to an average applied axial shifting load of about 600 N, or an F-to-BTL ratio of roughly 3:1.

Given the known practical constraints on detent spring selection, as well as the desirability of maintaining a relatively short axial distance between the point at which the detent is first loaded and the point at which the mating chamfers engage, the exemplary embodiment advantageously employs relatively-higher ramp angles of at least 45 degrees and, preferably, a ramp angle greater than about 50 degrees, as measured relative to a tangential reference plane, to increase the synchronizer's breakthrough load and, hence, effectively "slow-down" its nominal synchronization time, without having to greatly increase the detent's nominal spring rate.

In accordance with another aspect of the invention, the internal spline teeth of the sleeve have a minimum crest radius, and the friction ring has a maximum radial dimension that is less than the minimum crest radius of the internal spline teeth of the sleeve. In this manner, the internal spline teeth of the sleeve are radially spaced from the friction ring when the sleeve encircles the friction ring. It will be appreciated that, in contrast with known blocking rings which operate to slow the axial movement of the sleeve as the sleeve-to-blocking ring engagement generates the required index torque to "clock" the blocking ring's external spline teeth into registration with those of the clutch ring, the absence of direct contact between the sleeve and the friction ring ensures relatively rapid axial movement of the sleeve once the detent's breakthrough load has been overcome.

In accordance with another aspect of the invention, the conical friction surface of the clutch ring preferably defines a pair of axially-spaced frustoconical portions that are each rotatable with the gear about the shaft axis, with the "smaller" cone section projecting closer to the hub's axial face, and having a lesser maximum diameter than the minimum diameter of the "larger" cone, to thereby define a synchronizer with a "stepped" cone when viewed in longitudinal cross-section. The friction ring likewise features a "stepped" complementary friction surface, for engagement with the stepped cone sections on the clutch ring. The total cone torque generated by the stepped cone configuration of the exemplary embodiment advantageously equals the sum of the cone torques generated by each cone's individual engagement with its complementary friction surface of the friction ring. In this manner, the stepped cone configuration of the invention advantageously provides a significant increase in generated cone torque, without increasing the synchronizer's parts count. Indeed, in one embodiment, a stepped cone synchronizer in accordance with the invention features a stepped-cone clutch ring that is integrally formed with its respective gear, thereby further beneficially reducing synchronizer parts count and tolerance stack-up, as well as a further-relatively-reduced overall axial synchronizer dimension.

Preferably, the annular transition on the clutch ring between the smaller and larger frustoconical portions, as well as the complementary annular transition defined on the friction ring, is slightly canted relative to a reference plane orthogonal to the shaft's rotational axis, to thereby reduce the likelihood of a collection of oil at these transition sections upon engagement of the friction ring with the clutch ring. While the invention contemplates any suitable angle of inclination of these transitions, in a preferred embodiment, the angle of inclination is preferably greater than about 1 degrees and less than about 4 degrees relative to the orthogonal reference plane. Most preferably, the angle of inclination of each transition is about 2 degrees relative to the orthogonal reference plane.

Other objects, features, and advantages of the present invention will be readily appreciated upon a review of the subsequent description of the preferred embodiment and the appended claims, taken in conjunction with the accompanying Drawings.

DETAILED DESCRIPTION OF THE INVENTION

Figure 1:
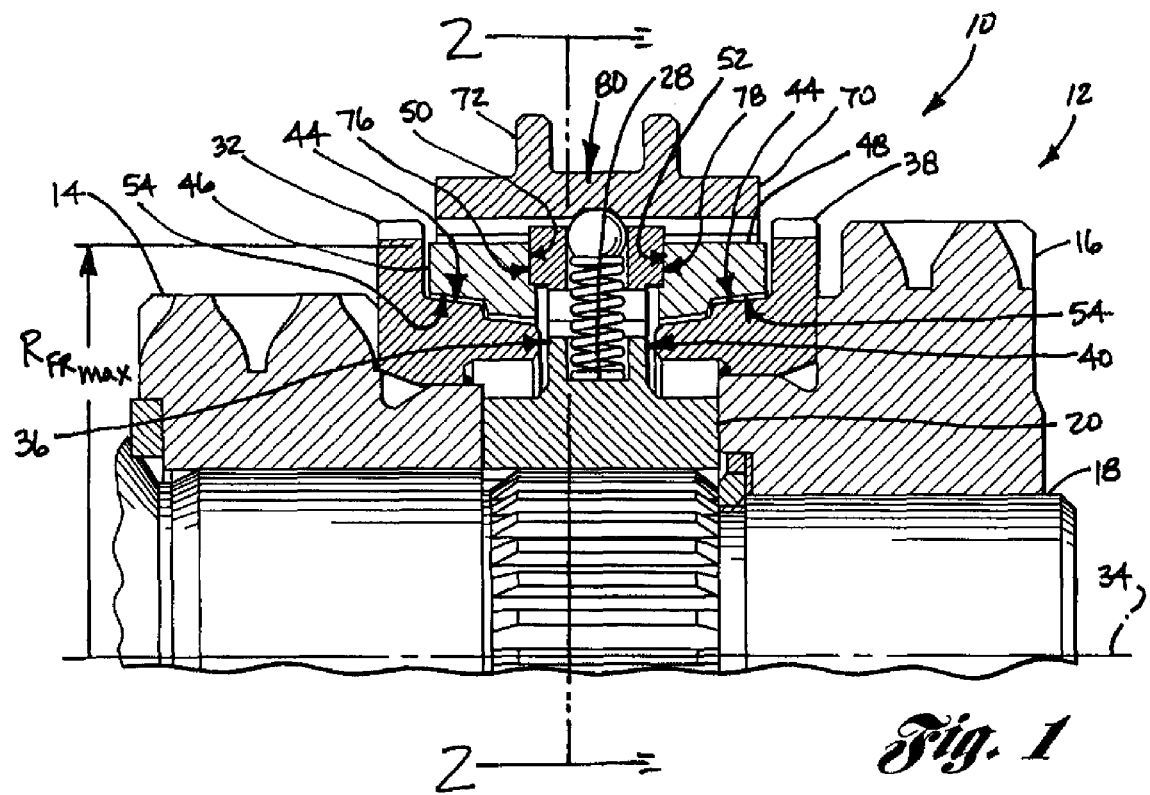
FIG. 1 is a partial longitudinal section of a parallel-shaft automotive transmission incorporating an exemplary stepped-cone synchronizer featuring a high breakthrough load in accordance with several aspects of the invention.
Figure 2:
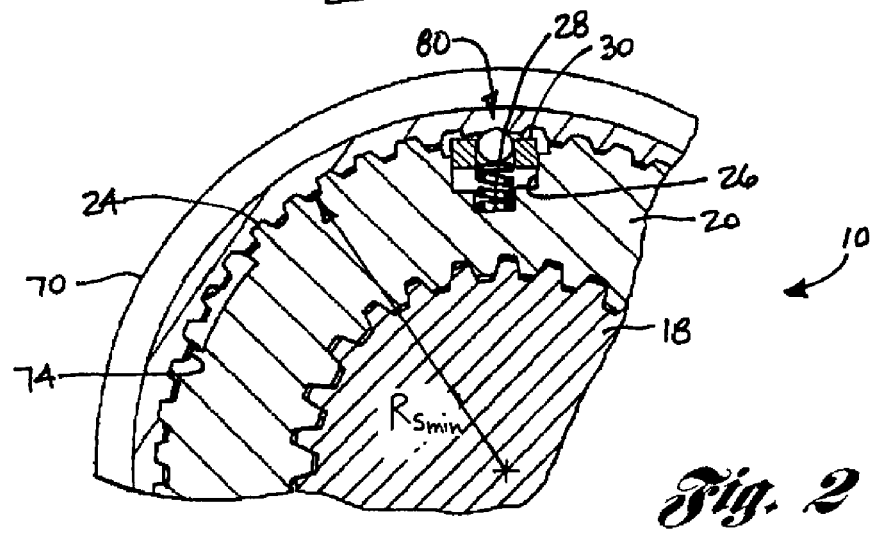
FIG. 2 is a partial transverse section of the synchronizer of FIG. 1, taken along Line 2-2 thereof.

Referring to FIGS. 1 and 2, an exemplary synchronizer 10 according to the invention, and incorporated within a parallel-shaft automotive transmission 12, is shown as being disposed between left and right transmission gears 14,16 that are respectively mounted as with suitable needle bearings for free rotation about a mainshaft 18. The synchronizer 10 includes a hub 20 splined to the mainshaft 18 so as to rotate with the mainshaft 18. As best seen in FIG. 2, the outer periphery 22 of the hub 20 defines a set of external spline teeth 24 and a plurality of circumferentially-spaced pockets 26 (only one of which is illustrated in the sectional view that is FIG. 2). Each pocket 26, which includes a radially-inner base surface 28, is adapted to support a respective strut 30 for relative axial movement, as further described below.

Referring to FIG. 1, an annular left clutch ring 32 is welded to the left gear 14, for rotation with the left gear 14 about the axis 34 of the mainshaft 18 opposite a left axial face 36 of the hub 20. Similarly, an annular right clutch ring 38 is welded to the right gear 16, for rotation with the right gear 16 about the mainshaft axis 34 opposite a right axial face 40 of the hub 20.

Figure 3:
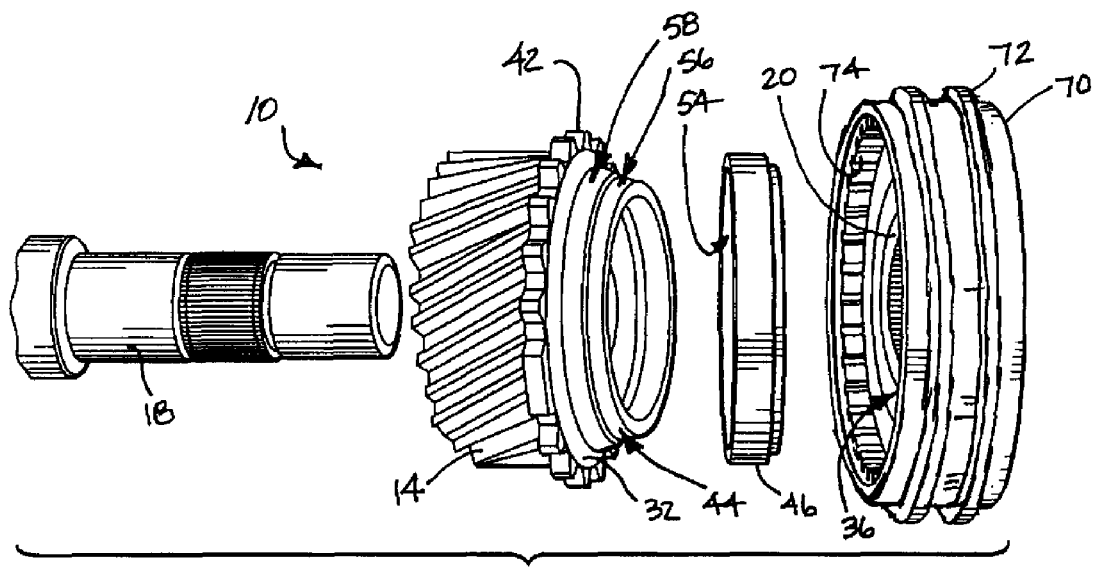
FIG. 3 is a partial exploded view of the synchronizer of FIG. 1, showing only the mainshaft, the left gear and left clutch ring, the left friction ring, and the hub-strut-sleeve assembly for clarity of illustration.

As seen in FIG. 1 and the partial exploded view shown in FIG. 3, each clutch ring 32,38 includes a peripheral surface defining another set of external spline teeth 42, and a radially-outer frustoconical friction surface ("external friction surface 44") projecting axially toward the left and right face 36,40 of the hub 20, respectively. A pair of friction rings 46,48 encircle the mainshaft 18 between the hub 20 and the left clutch ring 32, and between the hub 20 and the right clutch ring 38, respectively. Each friction ring 46,48 includes an axial face 50,52 opposing the respective left and right faces 36,40 of the hub 20. Each friction ring 46,48 further includes a radially-inner frustoconical friction surface ("internal friction surface 54") complementary to the respective external friction surfaces 44 of the left and right clutch rings 32,38.

Figure 4:
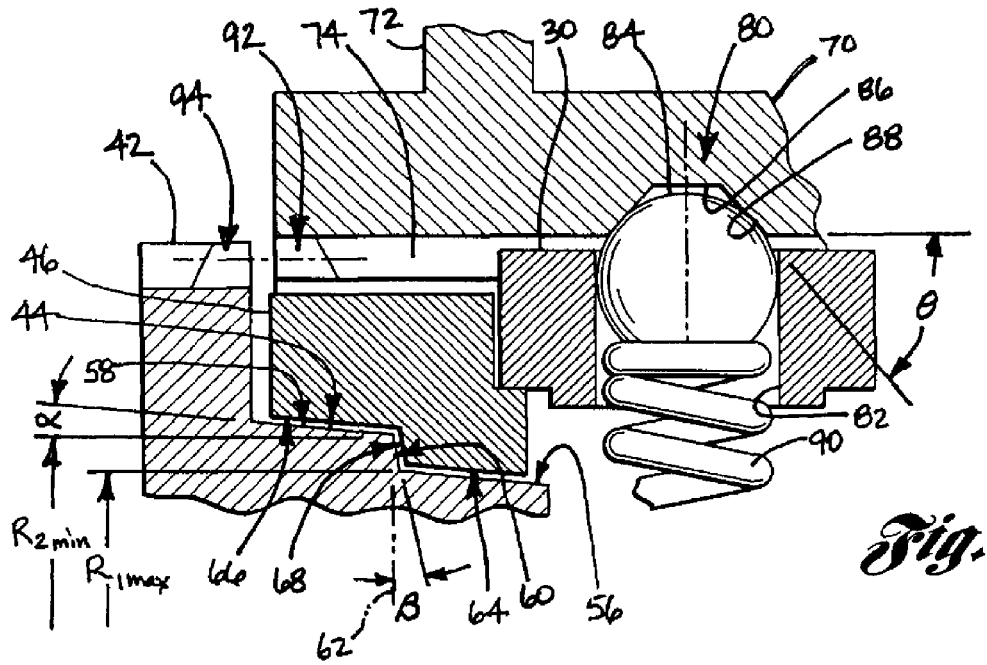
FIG. 4 is an enlarged partal section of the synchronizer of FIG. 1 showing the projecting stepped-cone of the clutch ring and complementary friction surfaces of the friction ring, as well as the high-breakthrough-load detent.

As best seen in FIGS. 3 and 4 in the context of the left clutch ring 32 and left friction ring 46, in accordance with an aspect of the invention, the external friction surface 44 of each clutch ring 32,38 beneficially includes a first frustoconical portion 56 having a maximum radius $R_{1max}$, and a second frustoconical portion 58, axially spaced from the first frustoconical portion 56, that has a minimum radius $R_{2min}$ greater than the maximum radius $R_{1max}$ of the first frustoconical portion 56. The first and second frustoconical portions 56,58 of each clutch ring's external friction surface 44 are themselves separated by a frustoconical transition 60, to thereby define a "stepped cone" when viewed in longitudinal cross-section, as seen in FIGS. 1, 3, and 4. The first and second frustoconical portions 56,58 of each clutch ring's external friction surface 44 are provided with the same nominal angle of inclination, or "cone angle α," typically ranging between about 6 degrees and about 8.5 degrees relative to the axis 34 of the mainshaft 18. The frustoconical transition preferably has an angle of inclination β of at least about 1 degrees relative to a radial reference plane, i.e., a reference plane 62 that is normal to the mainshaft axis. Preferably, the angle of inclination of the frustoconical transition 60 is no greater than about 4 degrees. Most preferably, the angle of inclination of the frustoconical transition 60 is about 2 degrees.

And, as best seen in FIG. 3, the complementary internal friction surface 54 of each friction ring 46,48 likewise includes two axially-spaced frustoconical portions 64,66 separated by a frustoconical transition 68. Preferably, the angle of inclination of the friction ring's complementary frustoconical transition 68 is roughly equal to that of the clutch ring's frustoconical transition 60, to further reduce the likelihood of collecting lubricating oil adjacent to the friction ring's frustoconical transition 68 upon engagement of the left friction ring 46 with the left clutch ring 32.

Referring again to FIGS. 1 and 2, the synchronizer 10 further includes a sleeve 70 encircling the hub 20 and axially movable relative to the hub 20 in response to an axial shifting load applied, for example, to a peripheral surface feature 72 of the sleeve 70 as by a suitable fork (not shown). The sleeve 70 includes a set of internal spline teeth 74 adapted to matingly engage the external spline teeth 24,42 of the hub 20 and of the clutch rings 32,38, respectively. In accordance with an aspect of the invention, each friction ring 46,48 has a maximum radial dimension $R_{FRmax}$ (as seen in FIG. 1), and the sleeve's internal spline teeth 74 have a minimum crest radius $R_{Smin}$ (as seen in FIG. 2) that is greater than the maximum radial dimension $R_{FRmax}$ of the friction rings 46,48. In this manner, the sleeve's internal spline teeth 74 remain radially spaced from each friction ring 46,48 when the sleeve 70 encircles the friction ring 46,48, thereby preventing any direct engagement between the sleeve 70 and the friction rings 46,48.

While the invention contemplates use of any suitable materials for the friction rings 46,48, including a sintered bronze material, a further advantage of preventing any direct engagement between the sleeve 70 and the friction rings 46,48, i.e., the absence of any external spline teeth on either of the friction rings 46,48, is that the invention contemplates a broader range of materials selection and manufacture for the friction rings 46,48, including the bonding of a suitable friction material to a forged, cast, or powdered metal annular substrate.

As best seen in FIGS. 1, 2, and 4, each strut 30 supported within its corresponding pocket 26 of the hub 20 includes a pair of end surfaces 76,78 adapted to engage the respective opposed axial face 50,52 of one of the friction rings 46,48, whereby each friction ring 46,48 is rotatable with the hub 20. A detent 80 operates to couple each strut 30 to the sleeve 70 for axial movement relative to the hub 20.

While the detent 80 may be of any suitable construction, in the exemplary synchronizer 10, a radial passage 82 is defined in each strut 30, and a detent ball 84 is partially captured within the strut passage 82 so as to be positioned proximate to a circumferential detent groove 86 defined in a radially-inner surface of the sleeve 70. The detent groove 86 defines a pair of opposed ramps 88 that are generally disposed at a ramp angle θ relative to the axis 34 of the mainshaft 18. A detent spring 90 is disposed in each pocket 26 of the hub 20, such that a radially-inner end of the spring 90 is supported by the base surface 28 of the hub 20 (as best seen in FIGS. 1 and 2), and a radially outer end of the spring 90 extends through the strut's radial passage 82 to bias the detent ball 84 into engagement with the sleeve's detent groove 86 (as best seen in FIG. 4).

Because the exemplary synchronizer 10 does not employ a blocking ring to otherwise slow the axial movement of the sleeve 70 towards one of the clutching rings 32,38 once the detent's breakthrough load BTL has been overcome, the parameters of the detent 80, such as the detent spring rate, the coefficient of friction between the detent ball 84 and the sleeve 70, and the ramp angle θ, are selected to achieve a breakthrough load significantly greater than about 100 N, in order to increase the time period required to initially overcome the detent after synchronization has commenced. Preferably, the detent parameters provide a breakthrough load greater than about 125 N. Most preferably, the detent 80 is designed to provide a breakthrough load greater than about 150 N.

Figure 5:
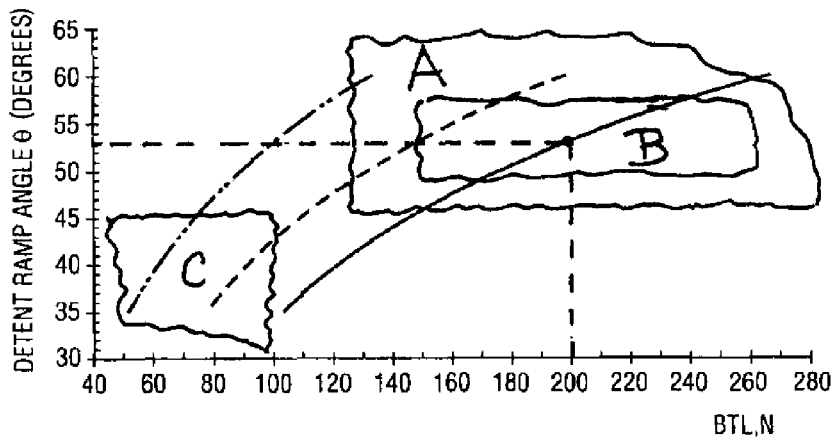
FIG. 5 shows several plots of detent ramp angle θ to the developed breakthrough load BTL, for three different nominal values for the detent spring force.

Because of practical limitations on increasing the detent spring force above perhaps 40 N, including packaging constraints (within the strut's radial passage), manufacturability, and perhaps even a potential spring rate variability due to tolerance stack-ups, as well as the relatively fixed coefficient of friction between the detent ball 84 and the ramp 88, the detent ramp angle θ and detent spring rates are preferably selected so as to operationally place the detent 80 within Region A of FIG. 5 (wherein a relatively-lower spring rate of about 20 N is shown in phantom line, an intermediate spring rate of about 30 N is shown in broken line, and a relatively higher spring rate of about 40 N is shown in solid line). Thus, a breakthrough load BTL greater than about 150 N is conveniently provided through use of a detent groove ramp angle θ greater than about 45 degrees (to thereby lie in Region A of FIG. 5). Most preferably, the detent spring rate is selected to utilize a ramp angle θ that is at least about 48 degrees, but no greater than about 57 degrees, i.e., to operationally place the detent 80 within Region B of FIG. 5. By way of comparison only, known synchronizers with blocking rings typically utilize detent ramp angles significantly less than 100 N, to thereby operationally place the detents of such known synchronizers with blocking rings within Region C of FIG. 5.

Figure 6:
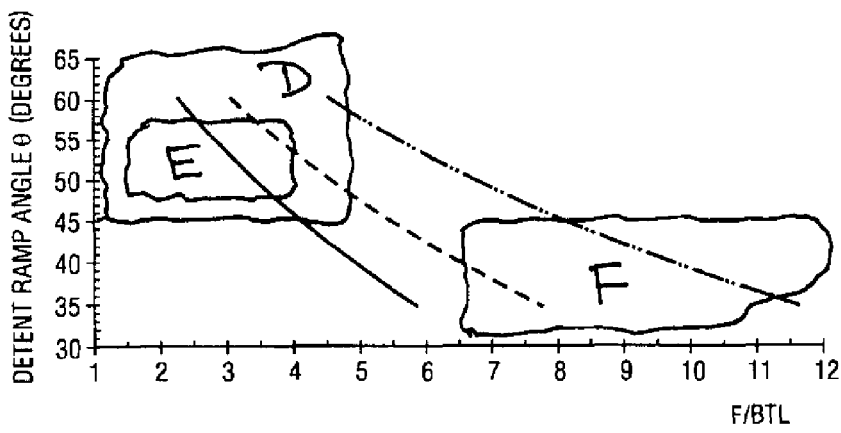
FIG. 6 shows several plots of detent ramp angle θ to the ratio of the applied axial shifting load F to the developed breakthrough load BTL, for the same three different nominal values for the detent spring force.

As a further preferred criterion, for a synchronizer 10 to be operated with an average applied shifting load F, the ratio of the average applied shifting load F to the detent's breakthrough load BTL is preferably less than about 4.8:1 and, most preferably, is less than about 4:1. Shown graphically in FIG. 6, the detent ramp angle θ and detent spring rate are preferably selected so as to operationally place the detent 80 within Region D of FIG. 6 (wherein a relatively-lower spring rate of about 20 N is shown in phantom line, an intermediate spring rate of about 30 N is shown in broken line, and a relatively higher spring rate of about 40 N is shown in solid line), and most preferably to operationally place the detent 80 within Region E of FIG. 6. Once again, by way of comparison only, known synchronizers with blocking rings typically utilize detent ramp angles and spring rates which operationally place such detents within Region F of FIG. 6. Thus, in a constructed embodiment of the exemplary synchronizer 10, where an average applied shifting load of about 600 N is generated using an electromagnetic actuator (not shown) in response to a shift demand signal, a desired breakthrough load of about 200 N, i.e., an F-to-BTL ratio of about 3:1, is conveniently achieved using a detent spring 90 having a spring rate of 40 N and a detent ramp angle θ of about 53 degrees.

Once the detent 80 is overcome by the applied axial shifting load F, the sleeve 70 moves axially towards one of the clutch rings 32,38 until leading-edge chamfers 92 defined on the sleeve's internal spline teeth 74 (as best seen in FIG. 4) matingly engage corresponding leading-edge chamfers 94 defined on the external spline teeth 42 of one of the clutch rings 32,38. The leading-edge chamfers 92 on the sleeve's spline teeth 74 are preferably disposed at a slightly greater angle than the corresponding leading-edge chamfers 94 on the clutch ring 32,38, for example, perhaps 2-3 degrees greater, to facilitate engagement. It will be appreciated that the mass of the sleeve 70 and the distance between the respective chamfers 92,94 of the sleeve 70 and the clutch rings 32,38 upon detent release are also preferably chosen to thereby achieve a desired time, from initial detent loading to full engagement of the sleeve 70 with the clutch ring 32,38, that is generally in the range of about 180 msec, for "firm" or "power" shifts, to about 300 msec, for "smooth" shifts, based upon the anticipated axial shifting load F that will be applied to the sleeve 70. It will be appreciated that, by eliminating any sleeve engagement with either of the friction rings 46,48, the invention advantageously allows for a substantial reduction in the time required to achieve full engagement once the detent 80 is overcome, for example, where "firm" shifts are desired, as when operating the transmission using electronically-controlled electromagnetic actuators operating in a "sport" program mode.

Figure 7:
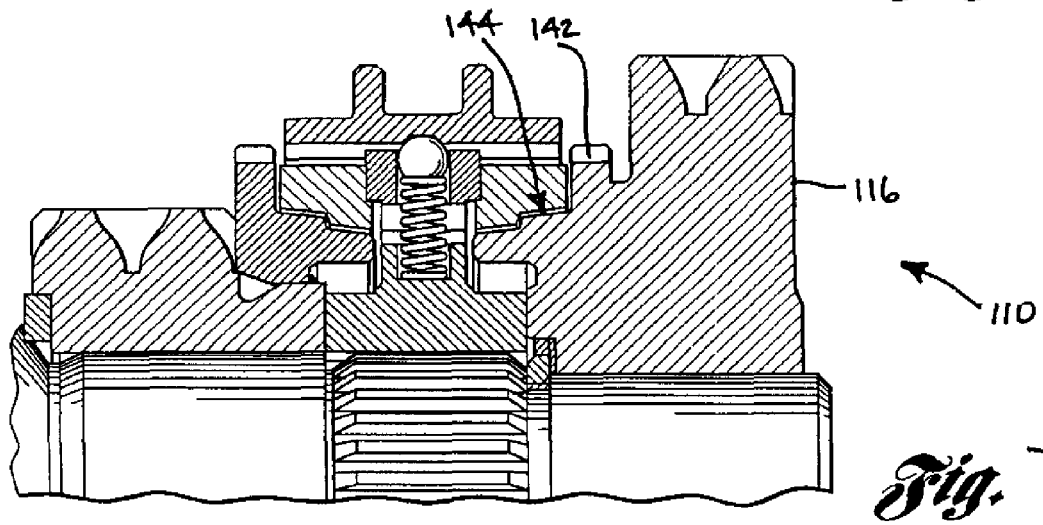
FIG. 7 shows a partial longitudinal section of an alternative synchronizer in accordance with the invention, in which the clutch ring associated with one of the gears is integrally formed with the gear.

FIG. 7 shows an alternate embodiment 110 of a transmission synchronizer in accordance with several aspects of the invention, wherein the features of the right clutch ring, including its stepped friction surfaces 144, are integrally formed with the left gear 116. It will be appreciated that, where the gear teeth defined on a given gear are significantly taller than the clutch ring's external spline teeth 142, as often is the case for numerically-higher-ratio gears 116, the features of the clutch ring including its projecting external friction surface 144, are advantageously formed directly on the gear 116 to thereby reduce parts count and potential tolerance stack-ups.

Thus, the invention advantageously achieves a synchronizer of reduced overall axial dimension, capable of providing a wider range of synchronization times, with a reduced parts count and a reduced tolerance stack-up.

While the above description constitutes the preferred embodiments, it will be appreciated that the invention is susceptible to modification, variation and change without departing from the proper scope and fair meaning of the subjoined claims. For example, while the disclosed embodiments both advantageously feature stepped cones on the clutch ring and the elimination of the index torque component of known strut-type synchronizers employing blocking rings, because the stepped cones achieve a greater cone torque in response to a given applied axial force, it will be appreciated that an advantage can yet be obtained in a conventional strut-type synchronizer when incorporating the stepped friction surfaces of the exemplary synchronizer 10, for example, by permitting use of a reduced detent ramp angle or a detent spring with a reduced spring rate. Further, while the external and internal friction surfaces 44,54 of the two clutch rings 32,38 and friction rings 46,48 of the exemplary synchronizer 10 have an identical configuration, it will be appreciated that the invention contemplates use of different friction surface configurations on either side of the hub, as desired, such as a single frustoconical friction surface on one clutch ring/friction ring pair and a stepped cone configuration on the other clutch ring/friction ring pair.

What is claimed is:

1. A strut-type synchronizer for rotatably coupling a gear to a shaft for rotation about a shaft axis in response to an applied axial shifting load, the synchronizer comprising:

a hub rotatable with the shaft about the shaft axis, wherein the hub includes a first axial face, and a peripheral surface defining a set of first spline teeth and a plurality of circumferentially-spaced pockets;

a clutch ring rotatable with the gear about the shaft axis, the clutch ring being axially spaced from the first axial face of the hub and including a peripheral surface defining a set of second spline teeth and a radially-outer friction surface projecting axially toward the first axial face of the hub;

a friction ring encircling the shaft between the hub and the clutch ring, wherein the friction ring includes an axial face opposing the first axial face of the hub, a maximum radial dimension, and a radially-inner friction surface complementary to the friction surface of the clutch ring;

a sleeve encircling the hub and axially movable relative to the hub in response to the applied axial shifting load, wherein the sleeve includes a set of third spline teeth adapted to matingly engage the first and second spline teeth of the hub and the clutch ring, respectively, and wherein the third spline teeth have a minimum crest radius greater than the maximum radial dimension of the friction ring, whereby the third spline teeth of the sleeve remain radially spaced from the friction ring when the sleeve encircles the friction ring;

a strut supported within each pocket of the hub for rotation with the hub, each strut being axially movable relative to the hub and including a surface adapted to engage the axial face of the friction ring; and a detent coupling each strut to the sleeve for axial movement relative to the hub, the detent having a breakthrough load significantly greater than about 100 N.

2. The synchronizer of claim 1, wherein the breakthrough load is greater than about 125 N.

3. The synchronizer of claim 2, wherein the breakthrough load is greater than about 150N.

4. The synchronizer of claim 1, wherein the detent includes a circumferential detent groove defined on an interior surface of the sleeve, the groove defining a ramp disposed at a ramp angle greater than about 45 degrees relative to a reference line parallel to the shaft axis.

5. The synchronizer of claim 4, wherein the ramp angle is at least about 48 degrees.

6. The synchronizer of claim 4, wherein a ratio of an average value for the axial shifting load applied during synchronization to the breakthrough load is less than about 4.8:1.

7. The synchronizer of claim 1, wherein the clutch ring is integrally formed with the gear.

8. A strut-type synchronizer for rotatably coupling a gear to a shaft for rotation about a shaft axis in response to an applied axial shifting load, the synchronizer comprising:

a hub rotatable with the shaft about the shaft axis, wherein the hub includes a first axial face, and a peripheral surface defining a set of first spline teeth and a plurality of circumferentially-spaced pockets;

a clutch ring rotatable with the gear about the shaft axis, the clutch ring being axially spaced from the first axial face of the hub and including a peripheral surface defining a set of second spline teeth and a radially-outer friction surface projecting axially toward the first axial face of the hub;

a friction ring encircling the shaft between the hub and the clutch ring, wherein the friction ring includes an axial face opposing the first axial face of the hub, a maximum radial dimension, and a radially-inner friction surface complementary to the friction surface of the clutch ring;

a sleeve encircling the hub and axially movable relative to the hub in response to the applied axial shifting load, wherein the sleeve includes a set of third spline teeth adapted to matingly engage the first and second spline teeth of the hub and the clutch ring, respectively, and wherein the third spline teeth have a minimum crest radius greater than the maximum radial dimension of the friction ring, whereby the third spline teeth of the sleeve remain radially spaced from the friction ring when the sleeve encircles the friction ring, a strut supported within each pocket of the hub for rotation with the hub, each strut being axially movable relative to the hub and including a surface adapted to engage the axial face of the friction ring; and a detent coupling each strut to the sleeve for axial movement relative to the hub, the detent having a breakthrough load significantly greater than about 100 N, wherein the friction surface of the clutch ring includes a first frustoconical portion having a maximum radius, and a second frustoconical portion axially spaced from the first frustoconical portion and having a minimum radius greater than the maximum radius of the first frustoconical portion.

9. The synchronizer of claim 8, wherein the clutch ring further includes a frustoconical transition disposed between the first and second frustoconical portions of the friction surface, the frustoconical transition generally having an angle of inclination relative to a radial reference plane of at least about 1degrees.

10. The synchronizer of claim 9, wherein the angle of inclination of the frustoconical transition is no greater than about 4 degrees.

11. A strut-type synchronizer for rotatably coupling a gear to a shaft for rotation about a shaft axis, the synchronizer comprising:

a hub rotatable with the shaft about the shaft axis, wherein the hub includes a first axial face, and a peripheral surface defining external spline teeth and a plurality of circumferentially-spaced pockets;

a clutch ring rotatable with the gear about the shaft axis and axially spaced from the first axial face of the hub, the clutch ring including a peripheral surface defining external spline teeth, and a radially-outer friction surface projecting axially toward the first axial face of the hub, wherein the friction surface of the clutch ring includes a first frustoconical portion having a maximum radius, and a second frustoconical portion axially spaced from the first frustoconical portion and having a minimum radius greater than the maximum radius of the first frustoconical portion;

a friction ring encircling the shaft between the hub and the clutch ring, wherein the friction ring includes an axial face opposing the first axial face of the hub, and a radially-inner friction surface complementary to the friction surface of the clutch ring;

a sleeve encircling the hub, wherein the sleeve includes internal spline teeth adapted to matingly engage the external spline teeth of the hub and the clutch ring, respectively;

a strut supported within each pocket of the hub for rotation with the hub, each strut being axially movable relative to the hub and including a surface adapted to engage the axial face of the friction ring; and a detent coupling each strut to the sleeve for axial movement relative to the hub.

12. The synchronizer of claim 11, wherein the first frustoconical portion of the friction surface of the clutch ring is positioned nearer to the first axial face of the hub than the second frustoconical portion, and wherein the clutch ring further includes a frustoconical transition disposed between the first and second frustoconical portions of the friction surface, the frustoconical transition generally having an angle of inclination relative to a radial reference plane of at least about 1 degrees.

13. The synchronizer of claim 12, wherein the angle of inclination of the frustoconical transition is no greater than about 4 degrees.

14. The synchronizer of claim 11, wherein the internal spline teeth of the sleeve have a minimum crest radius, and wherein the friction ring has a maximum radial dimension that is less than the minimum crest radius of the internal spline teeth of the sleeve, whereby the internal spline teeth of the sleeve are radially spaced from the friction ring when the sleeve encircles the friction ring; and wherein the detent has a breakthrough load that is significantly greater than about 100 N.

15. The synchronizer of claim 14, wherein the breakthrough load is greater than about 125 N.

16. The synchronizer of claim 15, wherein the breakthrough load is greater than about 150 N.

17. The synchronizer of claim 14, wherein the axial shifting load has an average value during synchronization, and wherein a ratio of the average value for the axial shifting load to the breakthrough load of the detent is less than about 4.8:1.

18. The synchronizer of claim 11, wherein the detent includes a circumferential detent groove defined on an interior surface of the sleeve, the groove defining a ramp disposed at a ramp angle greater than about 45 degrees relative to a reference line parallel to the shaft axis.

19. The synchronizer of claim 18, wherein the ramp angle is at least about 48 degrees.

20. The synchronizer of claim 11, wherein the clutch ring is integrally formed with the gear.

* * * * *